United States Patent
Chen et al.

(10) Patent No.: US 10,664,171 B2
(45) Date of Patent: *May 26, 2020

(54) MEMORY SYSTEMS AND METHODS INCLUDING TRAINING, DATA ORGANIZING, AND/OR SHADOWING

(71) Applicant: MICRON TECHNOLOGY, INC., Boise, ID (US)

(72) Inventors: Yi Chen, Shanghai (CN); Yukiyasu Murakami, Kamakura (JP)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/483,804

(22) Filed: Apr. 10, 2017

(65) Prior Publication Data

US 2017/0212694 A1    Jul. 27, 2017

Related U.S. Application Data

(63) Continuation of application No. 13/995,919, filed as application No. PCT/CN2013/000285 on Mar. 14, 2013, now Pat. No. 9,645,919.

(51) Int. Cl.
*G06F 12/02* (2006.01)
*G06F 3/06* (2006.01)
*G06F 13/16* (2006.01)

(52) U.S. Cl.
CPC ............ *G06F 3/0611* (2013.01); *G06F 3/065* (2013.01); *G06F 3/0688* (2013.01);
(Continued)

(58) Field of Classification Search
CPC ...... G06F 3/0611; G06F 3/0688; G06F 3/065; G06F 3/06
(Continued)

(56) References Cited

U.S. PATENT DOCUMENTS

| 4,594,690 A | 6/1986 | Meyers et al. |
| 7,519,754 B2 | 4/2009 | Wang et al. |

(Continued)

FOREIGN PATENT DOCUMENTS

| EP | 1804156 A2 | 4/2007 |
| JP | 60027965 A | 2/1985 |

(Continued)

OTHER PUBLICATIONS

Notice of Rejection dated Dec. 6, 2016 for JP Application No. 2015-561875.
(Continued)

*Primary Examiner* — Pierre Miche Bataille
(74) *Attorney, Agent, or Firm* — Dorsey & Whitney LLP (57) ABSTRACT

Described embodiments include memory systems that may shadow certain data stored in a first memory device (e.g. NAND flash device) onto a second memory device (e.g. DRAM device). Memory systems may train and/or re-organize stored data to facilitate the selection of data to be shadowed. Initial responses to memory commands may be serviced from the first memory device, which may have a lower latency than the second memory device. The remaining data may be serviced from the second memory device. A controller may begin to access the remaining data while the initial response is being provided from the first memory device, which may reduce the apparent latency associated with the second memory device.

19 Claims, 6 Drawing Sheets

(52) U.S. Cl.
CPC ........ *G06F 12/0246* (2013.01); *G06F 13/161* (2013.01); *G06F 2212/7208* (2013.01)

(58) Field of Classification Search
USPC .......................................................... 711/154
See application file for complete search history.

(56) References Cited

U.S. PATENT DOCUMENTS

| | | | |
|---|---|---|---|
| 7,716,411 B2 | 5/2010 | Panabaker et al. | |
| 8,171,208 B2 | 5/2012 | Yano et al. | |
| 8,219,742 B2 | 7/2012 | Terasaki | |
| 8,397,013 B1 | 3/2013 | Rosenband et al. | |
| 8,547,745 B1 | 10/2013 | Asnaashari | |
| 8,862,806 B2 | 10/2014 | Yoon et al. | |
| 8,868,797 B1 | 10/2014 | Kirac et al. | |
| 8,874,831 B2 | 10/2014 | Lee et al. | |
| 8,949,483 B1 | 2/2015 | Martin | |
| 9,020,892 B2* | 4/2015 | Chan | G06F 16/172 707/636 |
| 9,065,860 B2 | 6/2015 | Pangborn et al. | |
| 9,432,298 B1 | 8/2016 | Smith | |
| 2008/0126716 A1 | 5/2008 | Daniels | |
| 2009/0138654 A1 | 5/2009 | Sutardja | |
| 2010/0217924 A1 | 8/2010 | Panabaker et al. | |
| 2010/0293325 A1* | 11/2010 | Maheshwari | G06F 13/4243 711/105 |
| 2011/0271059 A1* | 11/2011 | Aho | G06F 9/3881 711/147 |
| 2012/0290769 A1 | 11/2012 | Okubo et al. | |
| 2012/0317364 A1 | 12/2012 | Loh | |
| 2013/0013561 A1* | 1/2013 | Chan | G06F 17/30132 707/636 |
| 2013/0238832 A1* | 9/2013 | Dronamraju | G06F 3/0608 711/103 |
| 2013/0308383 A1* | 11/2013 | Best | G06F 12/0638 365/185.08 |
| 2014/0101370 A1 | 4/2014 | Chu et al. | |
| 2015/0103481 A1* | 4/2015 | Haywood | G11C 8/00 361/679.32 |
| 2015/0160862 A1* | 6/2015 | Blott | G06F 3/0604 711/148 |
| 2017/0083474 A1* | 3/2017 | Meswani | G06F 13/4234 |

FOREIGN PATENT DOCUMENTS

| | | |
|---|---|---|
| JP | 06036550 A | 2/1994 |
| JP | 08194643 A | 7/1996 |
| JP | 08328949 A | 12/1996 |
| JP | 2002073409 A | 3/2002 |
| JP | 2002351741 A | 12/2002 |
| JP | 2006-155391 A | 6/2006 |
| JP | 2008052622 A | 3/2008 |
| JP | 2008-225608 A | 9/2008 |
| JP | 2008225608 A | 9/2008 |
| JP | 2009540431 A | 11/2009 |
| JP | 2010097333 A | 4/2010 |
| JP | 2011-186563 A | 9/2011 |
| JP | 2012234495 A | 11/2012 |
| JP | 2014078231 A | 5/2014 |
| TW | 200745848 A | 12/2007 |
| WO | 2007/145883 A1 | 12/2007 |

OTHER PUBLICATIONS

International Search Report and Written Opinion for PCT/CN2013/000285, dated Dec. 19, 2013.
Non-Final Rejection for Korean Patent Application No. 10-2105-7028342 dated Sep. 22, 2016.
Receipt of extended EP Search Report dated Dec. 15, 2016 for EP application No. 13878329.5.
First Office Action dated Apr. 12, 2017 for Chinese application No. 201380074687.7.
First Office Action dated Dec. 26, 2017 for Japanese Application No. 2017-001539.
Second Office Action dated Dec. 19, 2017 for Chinese Application No. 201380074687.7.

* cited by examiner

| | 602 LOGICAL TO PHYSICAL ADDRESS | | 604 PHYSICAL TO SHADOW ADDRESS | |
|---|---|---|---|---|
| LOGICAL ADDRESS | fS FLAG | PHYSICAL ADDRESS | fC FLAG | SHADOW ADDRESS |
| 0 | | | | |
| 1 | | | | |
| 2 | | | | |
| 3 | | | | |
| ... | | | | |
| MAX | | | | |

MEMORY SYSTEMS AND METHODS INCLUDING TRAINING, DATA ORGANIZING, AND/OR SHADOWING

CROSS-REFERENCE TO RELATED APPLICATIONS

This application is a continuation of U.S. patent application Ser. No. 13/995,919, filed Jun. 19, 2013, issued as U.S. Pat. No. 9,645,919 on May 9, 2017, which is a 371 national phase application claiming the filing benefit of International Application No. PCT/CN2013/000285, filed on Mar. 14, 2013. The afore-mentioned applications and patent are incorporated by reference herein, in their entirety, and for all purposes.

TECHNICAL FIELD

Embodiments of the invention relate generally to semiconductor memory, and examples of memory systems which may shadow some data from NAND-based flash memory in dynamic random-access memory (DRAM) are described.

BACKGROUND

Electrically erasable and programmable memory devices having flash memory cells are found in a wide variety of electrical devices. An example flash memory cell, also known as a floating gate transistor memory cell, may be similar to a field effect transistor, having a source region and a drain region that is spaced apart from the source region to form an intermediate channel region. A floating gate, which ma be made of doped polysilicon, may be disposed over the channel region and may be electrically isolated from the channel region by a layer of gate oxide. A control gate may be fabricated over the floating gate, and it may also be made of doped polysilicon. The control gate may be electrically separated from the floating gate by at dielectric layer. Thus, the floating gate is "floating," in the sense that it may be insulated from the channel, the control gate and all other components of the flash memory cell.

An example flash memory cell may be programmed by storing charge on the floating gate. The charge thereafter may remain an the gate for an indefinite period even after power has been removed from the flash memory cell. Flash memory cells may therefore be referred to as non-volatile. Charge may be stored on the floating gate by applying appropriate voltages to the control gate and the drain or source. For example, negative charge can be placed on the floating gate by grounding the source while applying a sufficiently large positive voltage to the control gate to attract electrons, which tunnel through the gate oxide to the floating gate from the channel region. The voltage applied to the control gate, called a programming voltage, and the duration that the programming voltage is applied as well as the charge originally residing on the floating gate, determine the amount of charge residing on the floating gate after programming.

An example flash memory cell may be read by applying a positive control gate to source voltage having, a magnitude greater than a threshold voltage. The amount of charge stored on the flash memory cell may determine the magnitude of the threshold voltage that must be applied to the control gate to allow the flash memory cell to conduct current between the source and the drain. As negative charge is added to the floating gate, the threshold voltage of the flash memory cell increases. During a read operation, a read voltage may be applied to the control gate that is large enough to render the cell conductive if insufficient charge is stored on the floating gate, but not large enough to render the cell conductive if sufficient charge is stored on the floating gate. During the read operation, the drain, which is used as the output terminal of the cell, may be precharged to a positive voltage, and the source may be coupled to ground. Therefore, if the floating gate of the flash memory cell is sufficiently charged, the drain will remain at the positive voltage. If the floating gate of the flash memory cell is not sufficiently charged, the cell will ground the drain.

Before a flash memory cell can be programmed, it must be erased in some cases by removing charge from the floating gate. The cell can be erased by applying a gate-to-source voltage to the cell that has a polarity opposite that used for programming. Specifically, the control gate may be grounded, and a large positive voltage applied to the source to cause the electrons to tunnel through the gate oxide and deplete charge from the floating gate. In another approach, a relatively large negative voltage is applied to the control gate, and a positive voltage, such as a supply voltage, is applied to the source region.

A typical flash memory device includes a number of flash memory cells, which may be arranged in rows and columns. Two common types of flash memory array architectures are the "NAND" and "NOR" architectures, so called for the logical form in which the basic flash memory cell configuration of each is arranged. NOR flash may generally act as a NOR gate—e.g. when a word line is brought high, a corresponding transistor may act to pull an output bit line low. NAND flash may generally include floating-gate transistors connected in a way resembling a NAND gate—e.g. several transistors may be connected in series, and only when all word lines are high may a bit line be pulled low.

Generally, NOR flash memory may provide a faster read response than NAND flash memory. Moreover, NAND flash memory may require housekeeping processes to refresh the memory and repair had blocks.

DETAILED DESCRIPTION

Certain details are set forth below to provide a sufficient understanding of embodiments of the invention. However, it will be clear to one skilled in the art that embodiments of the invention may be practiced without various of these particular details. In some instances, well-known circuits, control signals, timing protocols, and software operations have not been shown in detail in order to avoid unnecessarily obscuring the described embodiments of the invention.

Many present systems currently utilize NOR flash and masked read only memory (ROM) in applications requiring a small latency. Such applications include, but are not limited to, operation of gambling machines that may require highly random, sudden accesses to stored data corresponding to video and/or images. NAND flash may be desirable due to its generally lower cost, however the relatively higher latency associated with NAND flash may be prohibitive in some examples. Moreover, NAND flash may require housekeeping operations be performed at unpredictable times, which may result in a wait of up to seconds for data retrieval which, again, in some applications may be undesirable. Embodiments of the present invention accordingly provide memory architectures utilizing both NAND flash and DRAM memory in a manner which may improve latency performance for some applications. For example, certain data stored in the DRAM memory may be stored in the NAND flash memory. In some examples, housekeeping operations may be performed only following a power-up operation of the memory system.

While NAND flash and DRAM memory are used to describe example systems herein, in other examples other types of memory may be used. Generally, embodiments of the present invention may be used to improve the effective latency associated with one type of memory. Accordingly, portions of data from one set of memory devices (e.g. NAND flash) may be shadowed into, another set of memory devices (e.g. DRAM) generally having a lower latency than the first set of memory devices. The shadowed portion of data may be provided to the host while remaining data is retrieved from the higher latency memory devices (e.g. NAND flash).

Examples of particular applications, e.g. gambling, are described herein by way of example. It is to be understood that embodiments described herein may be used in any of a variety of applications including, but not limited to, cameras, phones, wireless devices, displays, chip sets, set top boxes, gaming systems, vehicles, and appliances.

Figure 1:
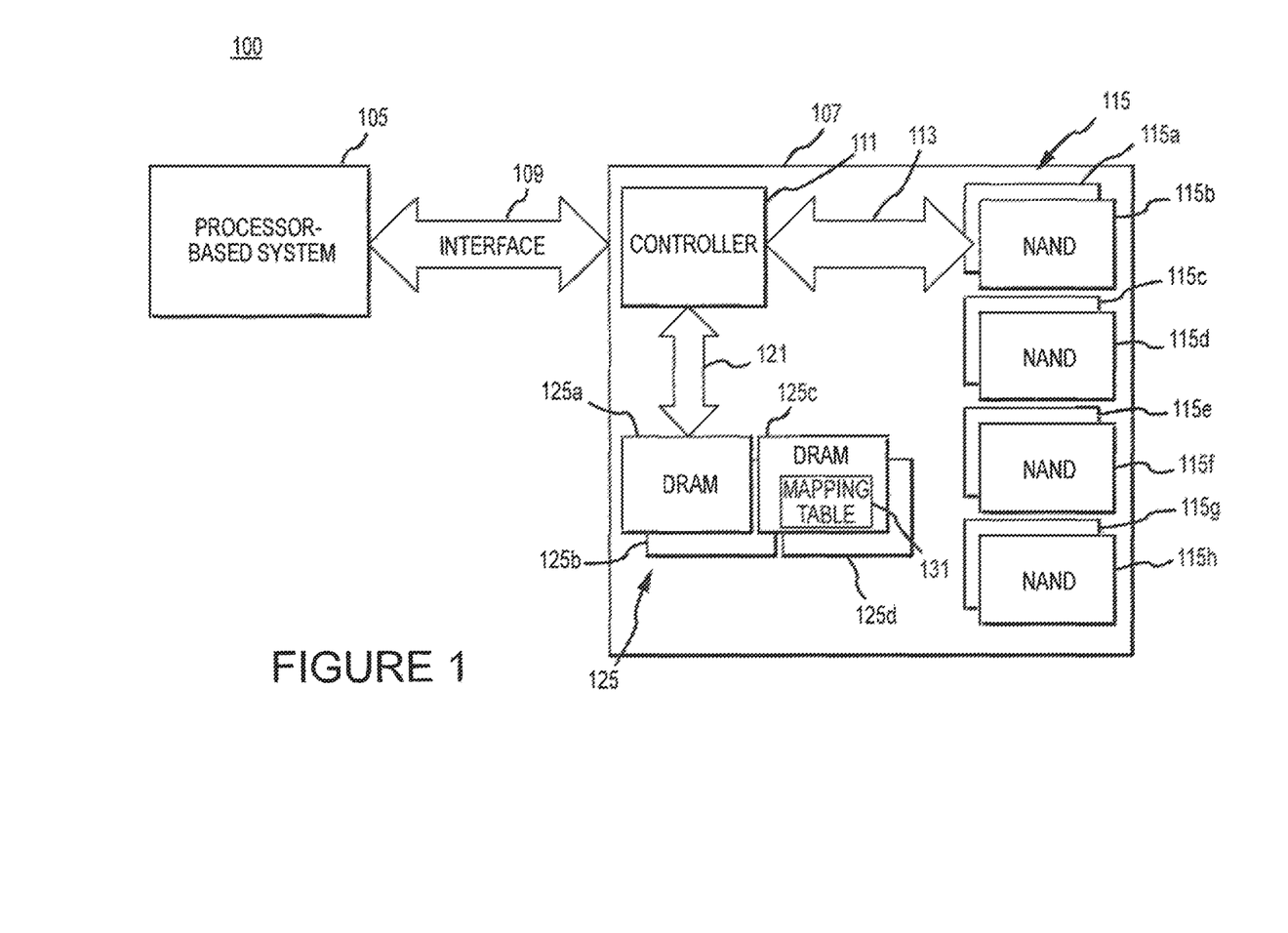
FIG. 1 is a schematic illustration of a system according to an embodiment of the present invention.

FIG. 1 is a schematic illustration of a system according to an embodiment of the present invention. The system 100 may include a processor-based system 105 that may be in communication with a memory system 107 over an interface 109. The interface 109 may be implemented using, for example, a serial advanced technology attachment (SATA) interface or other memory system interface. The processor based system 105, as described above, may include one or more electronic devices, including but not limited to, computers including desktop, laptop, and tablet computers, gambling machines, cameras, phones, wireless devices, displays, chip sets, set top boxes, gaming systems, vehicles, and appliances.

The memory system 107 may include a controller 111. The controller 111 may be coupled to an interface 113 for communication with one or more NAND flash devices 115. The interface 113 may, for example, be implemented using a bus or other electronic communication conduit and data may be communicated over the interface 113 in a manner compatible with the NAND flash devices 115, such as, but not limited to, a double data rate (DDR) protocol. The controller 111 may further be coupled to an interface 121 for communication with one or more DRAM devices 125.

Generally, any number of NAND flash devices 115 may be used, including one or more NAND flash devices. Eight NAND flash devices 115a-h are shown in FIG. 1. Moreover, any number of DRAM devices 125 may be used, including one more DRAM device. Four DRAM devices 125a-d are shown in FIG. 1 by way of example. The NAND flash devices 115 may generally be used to store data for use by the processor-based system 105. The data may include, for example, image or video data. A portion of the data stored on the NAND flash devices 115 may be shadowed onto the DRAM devices 125. In some examples, portions of the data stored on the NAND flash devices 115 is also stored on the DRAM devices 125. A mapping table 131 may be stored in one or more of the DRAM devices 125 to indicate which data is shadowed in the DRAM devices 215 from the NAND flash devices 115. In this manner, when the processor-based system 105 seeks to access certain data, in some examples, the data may be accessed from the DRAM devices 125, and remaining data may be accessed from the NAND flash devices 115 at least in part during a time the data is being accessed from the DRAM devices 125. Accordingly, by the time an initial portion of the requested data is read from the DRAM devices 125, the latency in accessing the remaining data on the NAND flash devices 115 may be over, and the remaining data read from the NAND flash devices 115 may be ready for use by the processor-based system 105. In this manner, data shadowing on the DRAM devices 125 may mask read latency associated with the NAND flash device 115.

Communication over the interfaces 113 and 121 in FIG. 1 may generally be arranged in any manner, including any number of channels. In the example of FIG. 1, the interface 113 may be implemented using, a four channel NAND interface. The eight NAND devices 115a-h may be arranged such that two NAND devices (e.g. dies) are accessible over each channel. In other examples, other numbers of channels and/or devices per channel may be used. In the example of FIG. 1, the interface 121 may also be implemented using two devices (e.g. dies) per channel, and the interface 121 may support two channels.

Figure 2:
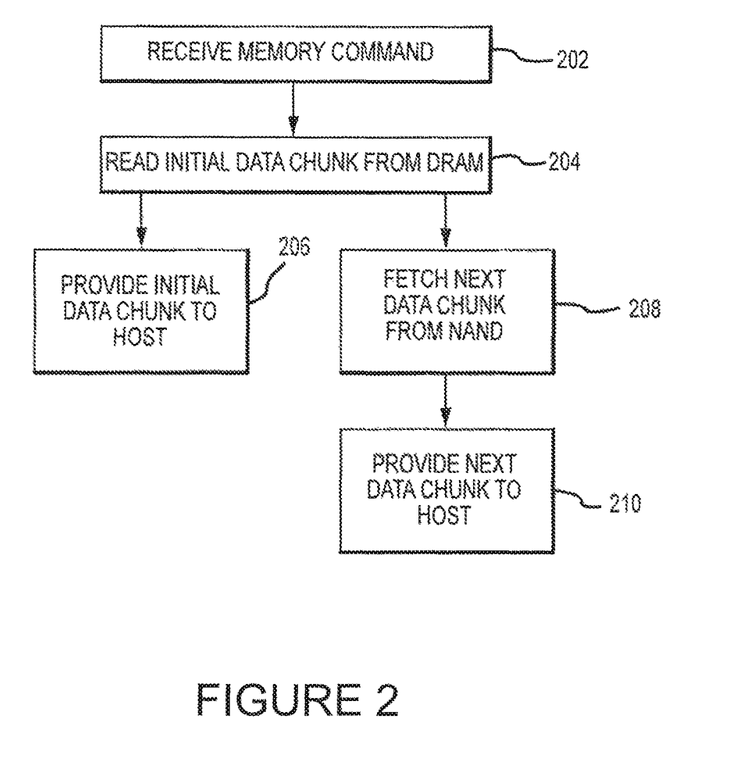
FIG. 2 is a flowchart illustrating an example method of servicing a memory command in accordance with an embodiment of the present invention.

FIG. 2 is a flowchart illustrating an example method of servicing a memory command (e.g., read command) in accordance with an embodiment of the present invention. In block 202, a memory command may be received. Referring back to FIG. 1, the memory command may be received by the controller 111 from the processor-based system 105. Responsive to the memory command, referring again to FIG. 2, an initial data chunk may be read from a DRAM device in block 204. For example, the controller 111 of FIG. 1 may read an initial data chunk corresponding to the data requested in the memory command from one or more of the DRAM devices 125. The size of the initial data chunk stored in the DRAM may vary in different embodiments, however, generally the size is selected to be sufficiently large that by the time the initial data chunk is provided to the processor-based system, a next data chunk may arrive from the NAND devices with an acceptable latency, e.g. the next data chunk may be ready for provision to the processor-based system once the initial data chunk has been provided to that processor-based system (e.g. host).

The initial data chunk may be provided to the processor-based system host) in block 206. During at least a portion of the time that the initial data chunk is being provided to the processor-based system requesting the data, a next data chunk may be being accessed in one or more NAND devices in block 208. The next data chunk may not be completely accessed during the time blocks 204 and/or 206 are being performed, but the next data chunk may at least be being accessed during that time. Accessing a next data chunk from one or more NAND devices may accordingly occur during at least a portion of a time that the initial data chunk is being provided to the host in block 206 and/or during at least a portion of time that the initial data chunk is being read from one or more DRAM devices in block 204. In this manner, the latency associated with accessing one or more NAND devices may be at least partially masked by the at least partially concurrent reading, and/or providing of the initial data chunk to the requesting processor-based system. The next data chunk may be provided to the host in block 210. Although not shown in FIG. 2, the blocks 208 and 210 may be repeated until the memory command has been serviced. For example, a further data chunk may be read from one or more NAND devices during a portion of tune that the next data chunk was being accessed in one or more NAND devices in block 208 and/or during a portion of time that the next data chunk was provided to the host in block 210. By the time the next data chunk has been provided to the host at the end of the block 210, then, the further data chunk may be ready for provision to the host.

Referring to FIG. 1, the system 100 may implement the process shown in FIG. 2, for example the controller 111 may read an initial data chunk from one or more of the DRAM devices 125 and provide the initial data chunk to the system 105. During at least a portion of time that the controller 111 is reading the initial data chunk and/or providing the initial data chunk to the system 105, the controller 111 may read a next data chunk from one or more of the NAND devices 115. The controller 111 may time these activities such that when the processors-based system 105 has received the first data chunk, the next data chunk is ready for provision to the processor-based system 105 with an acceptable amount, e.g. no additional, latency.

In one example of an implementation of the system of FIG. 1, a processor-based system 105 may require a throughput of the memory system 107 be greater than or equal to a specified throughput, 400 MB/s in one example. As described above, data may be read from the DRAM devices 125 and/or the NAND flash devices 115 in chunks. The chunks may have a particular size, e.g. 128 kB in one example. Using these exemplary numbers, the memory system 107 should be able to provide a 128 kB chunk to the processor-based system 105 within 320 µs. If the first chunk (e.g. 128 kB) is located in the DRAM, the time Tr for the controller 111 to analyze the memory command, address, read the data, and begin the response to the processor-based system 105 may be minimal. To minimize the apparent latency from accessing the requested data, the controller 111 should be able to read the next 128 kB chuck from NAND flash within 320 µs–Tr. Tr, may in one example be less than 10 µs. Accordingly, the controller 111 may have more than 310 µs to prepare the next 128 kB data chunk for provision to the processor-based system if it is accessing the NAND flash data chunk at approximately the same time as it is accessing the first data chunk from the DRAM. This timing may be met, for example, by a 4 channel solid state drive (SSD) controller and 16 kB/page single-level cell (SLC) NAND memory product in, one example, which may be able to achieve a read of 32 kB/channel and complete error correcting code (ECC) correction on those channels within the requisite 310 µs.

Embodiments of the present invention accordingly may advantageously shadow a first portion (e.g. chunk) of data to be accessed in DRAM devices while the remainder of the data to be accessed may be stored in NAND flash devices. Advantageously, embodiments of memory systems described herein may store the first data chunks of data that is generally accessed as a group in one or more of the DRAM devices. For example, the first data chunk of a file (e.g. a video, image, document, program, or the like) may be stored in the DRAM while the remaining data of the file may be stored in the NAND flash. In this manner, when the processor-based system 105 of FIG. 1 provides a memory command to the memory system 107, the first, data chunk corresponding to the memory command may be found in the DRAM while the remaining data may be found in the NAND flash.

While examples described herein include examples where a first portion of data to be accessed (e.g. one chunk) of data may be shadowed in DRAM devices, in other examples other portions of data may be shadowed (e.g. multiple initial data chunks). Generally, the more data that is shadowed, the longer a latency of the NAND flash devices that may be effectively hidden, however, the greater amount of storage that may be required in the DRAM for shadowed data.

Figure 3:
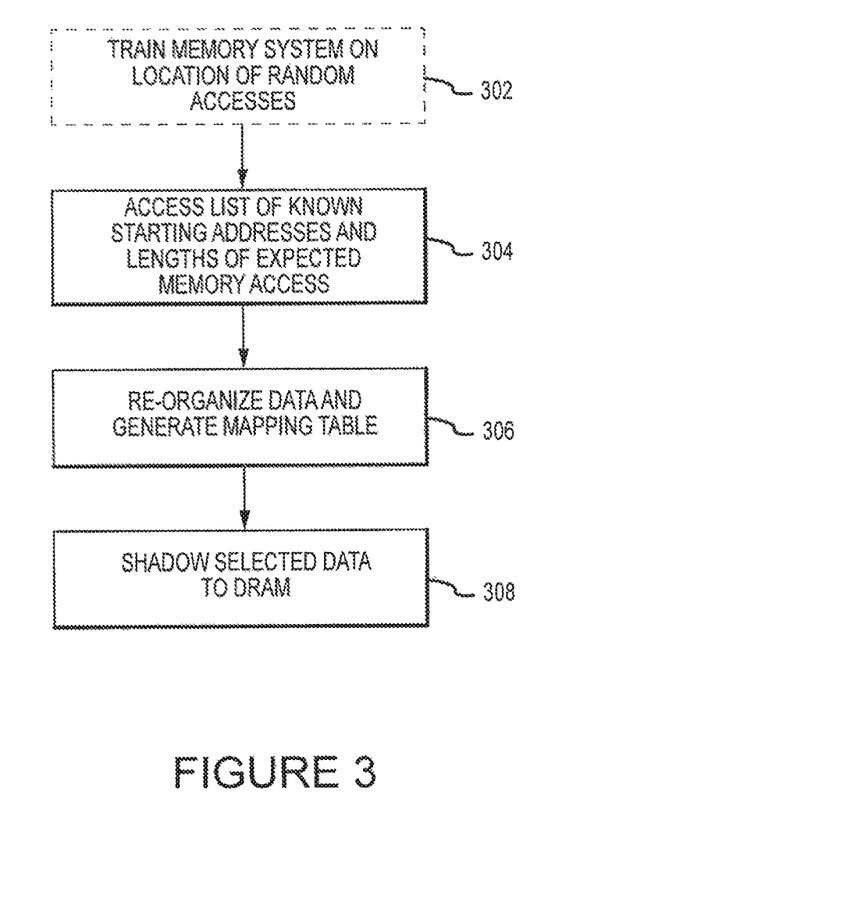
FIG. 3 is a flowchart of an example method for shadowing data from NAND flash devices to DRAM devices in accordance with an embodiment of the present invention.

Examples of how the shadowing may be implemented are further described herein. FIG. 3 is a flowchart of an example method for shadowing data from NAND flash devices to DRAM devices in accordance with an embodiment of the present invention. Generally, it may be desirable to know starting addresses and lengths of data to be accessed in the NAND flash device. In read only systems (e.g. gambling machines), the data may be pre-programmed into the memory system and may not change during operation. Accordingly, in some embodiments, the location and length of data to be accessed (e.g. the starting address and length of data of individual files), may be known ahead of time, and a data structure of starting addresses and lengths may be provided to or stored in the memory system. For example, such a data structure may be stored in one or more of the NAND flash devices 115 of FIG. 1 or the DRAM devices 125 of FIG. 1. The data structure of starting addresses and lengths may be implemented as a list, for example. Although other data structures may be used as well, the data structure of starting addresses and lengths will be referenced as a "list."

The list of known starting addresses and lengths may be accessed in block 304 of FIG. 3 and may be used to identify chunks of data corresponding to the known starting addresses to be shadowed to the DRAM devices. In some examples, a memory system, such as the system 107 of FIG. 1, may be trained in block 302 of FIG. 3, to identify itself the location and length of data to be accessed in the NAND flash devices. During training in block 302, a memory controller (e.g. the controller 111 of FIG. 1) may log addresses of memory commands received from a host (e.g. the processor-based system 105 of FIG. 1). By analyzing the list of addresses, the controller may itself generate the list of known starting, addresses and lengths of data to be accessed in block 304 of FIG. 3. In other examples, the training in block 302 may be implemented through other analysis of the content of the NAND flash devices in a memory system. For example, headers or other data strings indicative of a start of a data grouping that may be requested in a memory command from the processor-based system may be identified by the controller together with the length of the data grouping. In some examples, training may occur during a training period which may be indicated, for example, by a signal provided from the processor-based system to the memory controller.

In block 306, data may be re-organized and a mapping table generated. The data may be re-organized for storage the NAND flash devices in a manner that may be conducive to shadowing, portions of the data in the DRAM devices.

The generated mapping table may include a map of logical to physical addresses. The logical addresses may be the addresses as specified by, e.g. the processor-based system 105 of FIG. 1, while the physical addresses may be the addresses for the of NAND flash devices as understood by, e.g. the controller 111 of FIG. 1. Two types of data re-organization may occur. In some embodiments only one type may occur and in other embodiments both may occur. In some embodiments other types of data re-organization may also occur.

A first type of data re-organization may pack multiple anticipated memory accesses corresponding to data of less than a size of a data chunk together into a single data chunk. Generally, a data chunk refers to an amount of data that may be read at a same time from the NAND flash in a given memory system. With reference to FIG. 1, in an example where the interface 113 supports 4 channels with two die per channel and two pages per die may be accessed, and a page size of 8 bytes, the data chunk size may be 4×2×2×8=128 kB.

Generally, the data chunk may also be referred to as a super page. The data chunk should be sufficiently sized such that the time for the data chunk to be output from the NAND flash devices of FIG. 1 is less than or equal to the time for the same size data chunk to be output from the DRAM, as has been described above to hide or reduce the effective latency of the NAND devices.

Data shadowed from the NAND device to the DRAM devices may be stored in data chunks. To reduce the amount of space required for shadowing in the DRAM devices, it may be advantageous to consolidate data associated with memory accesses less than a size of a data chunk. Accordingly, a first type of data re-organizing that may occur in block 306 of FIG. 3 is to map logical addresses corresponding to data having a length less than a data chunk e.g. 128 kB in one example) to a same data chunk. For example, the table generated in block 302 may include one expected memory access at a first logical address for data having a length of 64 kB and a second expected memory access for data at a second logical address having a length of 64 kB. Both the first and second logical addresses may be mapped to a same data chunk of the NAND flash devices such that the two 64 kB memory accesses are located in a 128 kB data chunk. Any combination of data accesses totaling a size of a data chunk may be mapped to a single data chunk. For example, data associated with two 32 kB accesses and a 64 kB access may be re-organized to a single data chunk. In another example, data associated with 5 16 kB accesses, a 32 kB access, and two 8 kB accesses may be re-organized to a single data chunk. In this manner, the controller 111 may access the list of starting addresses and lengths which may be generated in block 302 to map accesses to data having a length less than a data chunk into a consolidated set of data chunks. As will be described further below, the consolidated data chunks may be shadowed on one or more of the DRAM devices, such that the data accesses for these data of a size less than the data chunk may be serviced from the DRAM devices.

Figure 4:
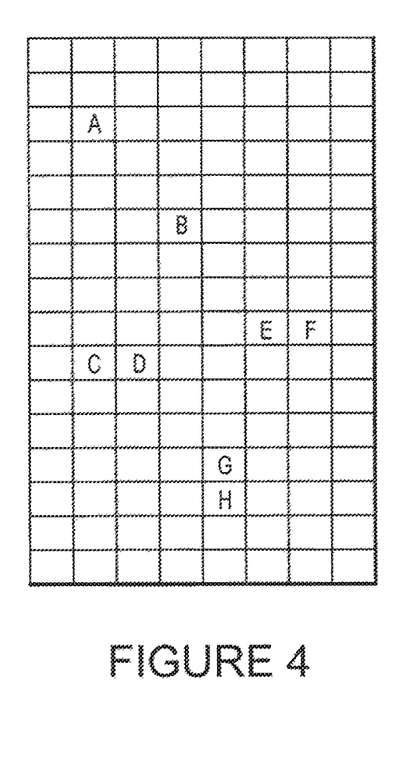
FIG. 4 is a representation of at least a portion of a logical address space in accordance with an embodiment of the present invention.
Figure 5:
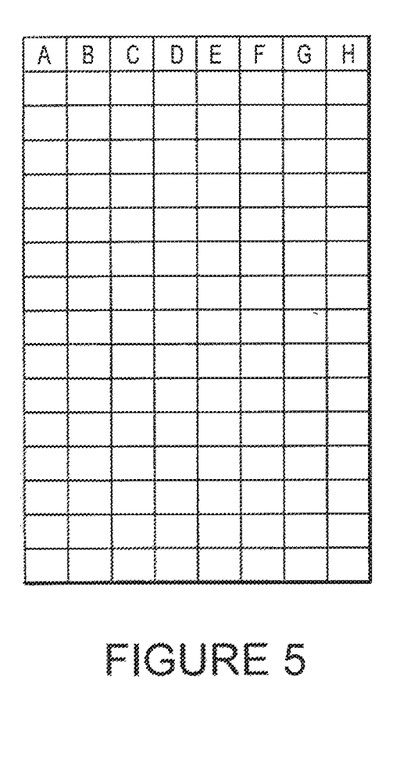
FIG. 5 is a representation of at least a portion of a physical address space on a NAND flash device in accordance with an embodiment of the present invention.

FIG. 4 is a representation of at least a portion of a logical address space in accordance with an embodiment of the present invention. FIG. 5 is a representation of at least a portion of a physical address space on a NAND flash device in accordance with an embodiment of the present invention. As shown in FIG. 4, a processor-based system the system 105 of FIG. 1) may access data by requesting data A, B, C, D, E, F, G, or H as shown. However, those data are spread out in logical address space and are less than a data chunk in size. During the data re-organization 306 of FIG. 3, the data may be re-organized to physical address space as shown in FIG. 5 where data A, B, C, D, E, F, G, and H are consolidated into a single data chunk.

Another type of data re-organization which may occur in block 306 is to realign data corresponding to accesses which are larger than a data chunk in size (e.g. larger than 128 kB in some examples). If the first address data corresponding to an access larger than a data chunk is aligned with a data chunk, no reorganization may occur. However, if the first address is not aligned with a data chunk boundary, the physical address of the first address may be shifted to align with a data chunk boundary, and the resulting map between the first address and the physical address may be stored in a logical to physical address table.

The data re-organization of block 306 in FIG. 3 may be performed, for example, by the controller 111 of FIG. 1. In some examples, the controller 111 may access a list of known starting addresses for memory accesses and lengths of data to be accessed, such as the list generated in block 302 of FIG. 3. The controller 111 may consolidate together data associated, with memory accesses where the data to be accessed is less than a size of a data chunk, and may align data associated with memory accesses where the data to be accessed is greater than a size of a data chunk with a data chunk. The controller 111 may generate a logical to physical mapping table which reflects the re-organization. In some examples, data had already been stored to one or more of the NAND flash devices 115 and may be moved to the locations corresponding to those identified in the re-organization process. In other examples, data may be written to the NAND flash devices by the controller 111 in accordance with the organization identified in the re-organization process of block 302.)

In block 308 of FIG. 3, selected data may be shadowed from one or more of the NAND flash devices to one or more DRAM devices. For example, the controller 111 may shadow the selected data to the DRAM devices. Shadowing may include copying the selected data from one or more of the NAND flash devices to one or more of the DRAM devices such that the data is stored both in one or more of the NAND flash devices and in one or more of the DRAM devices. Generally, in block 308 the selected data may include 1) data chunks on one or more of the DRAM devices that are associated with memory accesses for data having a length less than or equal to a data chunk; and/or 2) first data chunks associated with memory accesses for data, having a length larger than a data chunk. In this manner, memory commands for data having a length less than or equal to a data chunk may generally be serviced from one or more of the DRAM devices. Further, memory commands for data having a length greater than a data chunk may have a first portion of the memory command serviced from one or more of the DRAM devices and a remainder of the memory command serviced from one or more of the NAND flash devices.

The shadowing in block 308 may be performed, for example, by the controller 111 of FIG. 1, which may access the list of known starting addresses and lengths which may be generated in block 302 and the mapping table from block 306 to select and shadow the data in block 308. The controller 111 may further update entries in the mapping table to reflect the shadowing as will be further described below.

The shadowing in block 308 may be performed in a variety of ways. In one example, shadowing may be initiated by receipt at a signal indicative of shadowing which may be supplied by, e.g. a processor based system such as the system 105 of FIG. 1. The controller may then provide a busy signal to the host indicative of shadowing beginning, and remove the busy signal and/or provide a different signal to the host indicative of shadowing having been completed. In some examples, the host may not trigger shadowing again by providing the signal indicative of shadowing until a next time the memory system experiences a power cycle (e.g. power on).

In another example, shadowing may be performed during training, e.g. at least in part concurrently with block 302 of FIG. 3. When a random access is received by a controller during training, a relevant portion of the data may be shadowed when the data associated with the access has not yet been shadowed.

Figure 6:
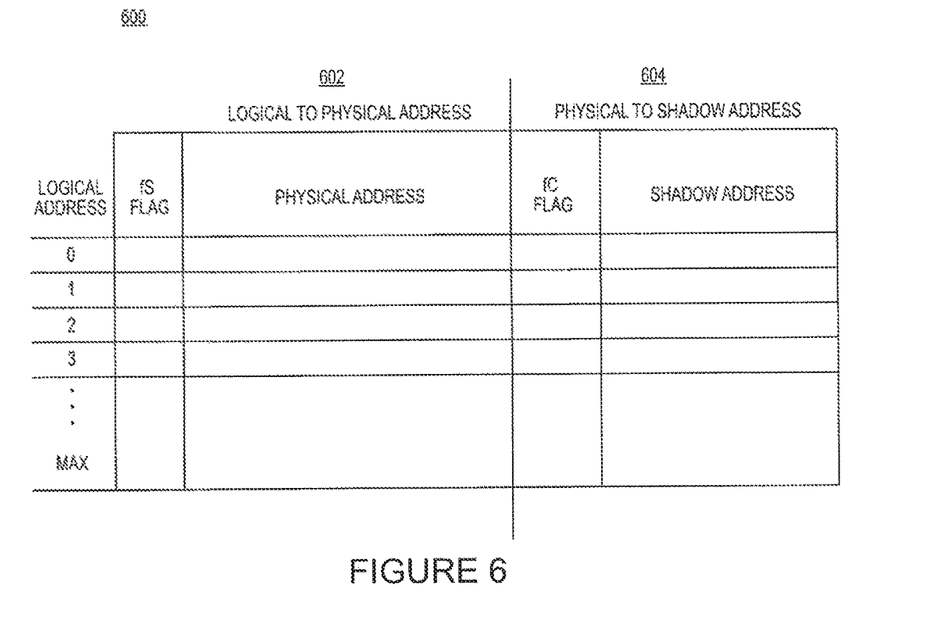
FIG. 6 is a schematic illustration of a mapping table in accordance with an embodiment of the present invention.

FIG. 6 is a schematic illustration of a mapping table in accordance with an embodiment of the present invention. The mapping table 600 may be generated, for example, in blocks 306 and/or 308 of FIG. 3. The mapping table 600 includes a logical to physical address map 602 and a physical to shadow address map 604. The logical to physical address map 602 may associate a logical address with the physical address in NAND flash memory where the data may be located, as may be affected by the re-organization process described above. Moreover, the logical to physical address map 602 may include a flag, referred to as an fS flag in FIG. 6. The fS flag may indicate whether or not the associated address is shadowed in DRAM memory. In one, example, the fS flag may be one bit in length, with 0 indicative that the logical-physical address is not shadowed, and 1 indicative that the address is shadowed. In some examples, the addresses used in the table 600 are block addresses.

Accordingly, referring back to FIG. 3, as data is re-organized, the controller 111 of FIG. 1 may record the associations between logical and physical addresses in the mapping table 600 of FIG. 6. The mapping table 600 may be stored in one or more DRAM devices 125 of FIG. 1, such as is shown by the mapping table 131, or may be stored in one or more of the NAND devices 115 of FIG. 1. In some embodiments, the mapping table 600 may be stored in the DRAM devices 125 and/or the NAND devices 115.

The mapping table 600 of FIG. 6 may further include associations between physical and shadow addresses 604. If data stored at a particular physical address in the NAND flash is shadowed to DRAM, the fS flag in the mapping table 600 may so indicate shadowing. Moreover, the associated address of the shadowed data may be stored in the mapping table 600.

Moreover, the physical to shadow address map 604 may include a flag, referred to as an fC flag in FIG. 6. The fC flag may indicate whether or not the next data chunk is located in shadow memory (e.g. DRAM) or in the NAND flash memory. In one example, the fC flag may be one bit in length, with 0 indicative that the following data chunk is located in NAND flash, and 1 indicative that the following data chunk is located in the shadow memory (e.g. DRAM). So, for example, if the logical address corresponds with a physical address where the memory to be accessed is expected to be less than a single data chunk, the next memory command may also be serviced from the shadow memory (e.g. DRAM), so the fC flag may be set to 1. If the logical address corresponds with a physical address where the memory to be accessed is expected to be greater than a single data chunk, only the first data chunk may be located in the shadow memory, and the fC flag may be set to 0 to indicate that the next data chunk is located in the NAND flash.

Referring back to FIG. 3, the fS, fC, and shadow address portions of the mapping table 600 may be generated during block 308 when data is shadowed to the DRAM. In this manner, the controller 111 of FIG. 1 may provide the fS, fC, and/or shadow address values and store them in a mapping table stored in the DRAM, NAND flash, or combinations thereof. While a mapping table including logical to physical address associations and physical to shadow address associations is shown in FIG. 6, in other examples multiple tables may be used (e.g. one for logical to physical addresses and another, for physical to shadow address associations). In other examples, data structures other than tables may be used to represent some or all of the information shown in FIG. 6.

Figure 7:
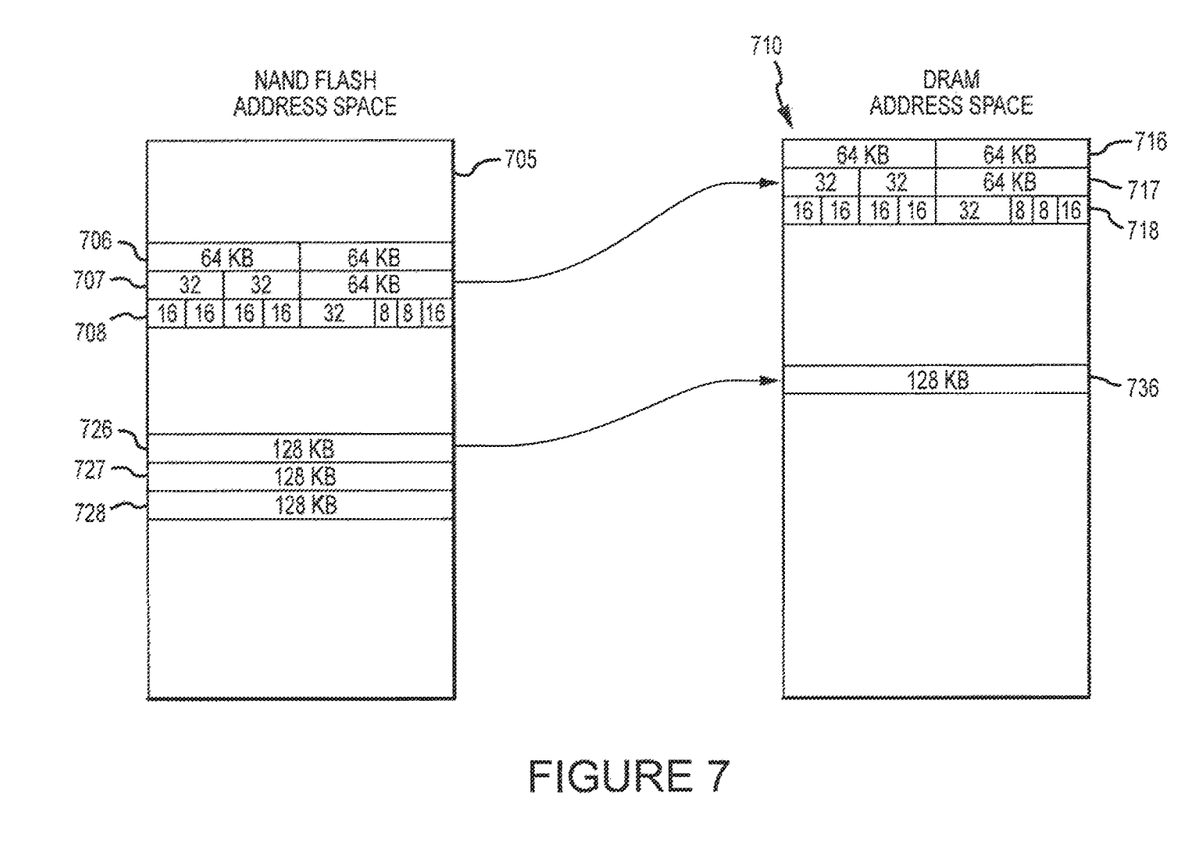
FIG. 7 is a schematic illustration of NAND flash and DRAM address spaces arranged in accordance with an embodiment of the present invention.

FIG. 7 is a schematic illustration of NAND flash and DRAM, address spaces arranged in accordance with an embodiment of the present invention. The NAND flash address space 705 is shown, which may be spread over one or more NAND flash devices, such as the devices 115 of FIG. 1. The address space includes data chunks 706-708. These data chunks are illustrated as containing data less than a size of a data chunk that may have been consolidated during a data re-organization process described herein. For example, the data chunk 706 may include two 64 kB segments of data, each of which is expected to be responsive to a respective memory command. Similarly, the data chunk 707 may include two 32 kB segments of data and one 64 kB segment of data, each of which is again expected to be responsive to a respective memory command. The data chunk 708 may include 5 16 kB segments, 2 8 kB segments, and 1 32 kB segment, each of which is expected to be responsive to a respective memory command. The data segments shown in data chunks 706-708 have been arranged to be stored in a smallest number of possible data chunks, where the data chunk size shown in FIG. 7 is 128 kB. Because, the data in the data chunks 706-708 are associated with memory accesses for data less than a size of a data chunk, the data chunks 706-708 may be shadowed to one or more DRAM devices, for example in block 308 of FIG. 3. Accordingly, in FIG. 7, the data chunks 706-708 have been shadowed into DRAM address space 710 as data chunks 716, 717, and 718.

As has been described herein, the controller 111 of FIG. 1 may perform the shadowing shown in FIG. 7 and described with reference to FIG. 3. The controller 111 may further generate the mapping table, for example the mapping table 600 of FIG. 6. Referring to FIG. 7 again, when the data chunk 706 is shadowed to DRAM as data chunk 716, the following may result in the mapping table. The logical address of each of the 64 kB data segments making up the data chunk 706 may be associated with the respective addresses in the data chunk 706 by storing those NAND flash addresses in the physical address column of the logical to physical address 602 portion of the mapping table associated with the correct logical address. Moreover, because the data accesses in the data chunks 716-718 are expected to be less than or equal to the size of a data chunk, the data has been shadowed, so the corresponding addresses of the data segments in the data chunk 716 in DRAM address space 710 may be stored in the shadow address portion of the physical to shadow address table 604. The data is shadowed data, so the fS flags for the data may be set (e.g. by the memory controller 111 of FIG. 1) to indicate the data is shadowed. Moreover, because the data in the data chunks 716-718 are associated with data accesses for data equal to or less than a size of a data chunk, the next data chunk to be read will come from the DRAM devices as well (e.g. because the first portion of each memory access may be shadowed to DRAM), accordingly, the fC flags for the data in data chunks 716-718 may be set (e.g. by the memory controller 111 of FIG. 1) to indicate the next data chunk may be read from the DRAM.

Referring again to FIG. 7 data chunks 726-728 may correspond to a data access for an amount of data greater than a size of a data chunk (e.g. three data chunks 726-728). As has been described above, the data chunks 726-728 may have been re-organized to be aligned with a data chunk boundary and/or moved to accommodate other data reorganization. Accordingly, the physical address of the data chunks 726-728 may be stored in the logical to physical address table 602 of FIG. 6 corresponding to the relevant logical addresses. Because the data access is for an amount of data larger than a data chunk, only a first data chunk may be shadowed to the DRAM in some examples. Accordingly, the data chunk 726 may be shadowed to the DRAM at data chunk 736. The fS flag for the physical address corresponding to the data chunk 726 may be set (e.g. by the controller 111) to indicate that the data chunk 726 is shadowed. However, the fS flag for the physical address corresponding to the data chunks 727 and 728 may be set (e.g. by the controller 111) to indicate that the data chunks 727 and 728 are not shadowed. The shadow address corresponding to the DRAM data chunk 736 may further be stored in the physical to shadow address table 604. Because the data chunk 736 pertains to a data access of greater than a data chunk, the fC flag may be set (e.g. by the controller 111) to indicate that the next data access may come from the NAND flash devices.

In examples of the present invention, training, data re-organization, and shadowing, examples of which have been described with reference to FIGS. 3-7, may occur during power-up of a memory system, prior to memory system distribution (e.g. during manufacture), or at other scheduled times. While training, data re-organization, and/or shadowing may in some examples occur dynamically during operation, dynamic operation may not be advantageous in applications desiring to minimize latency associated with accessing the stored data.

During operation of the exemplary memory system of FIG. 1, the controller 111 may perform shadowing during power-up as described with reference to FIG. 3. The controller 111 may store an indication in a status register or provide a busy signal to the processor-based system 105 indicative of the unavailability of some or all of the memory system 107 functionality due to shadowing operations. When shadowing is completed, the controller 111 may store an indication in a status register or provide a signal to the processor-based system 105 indicative of availability of the memory system 107.

On receipt of a memory command from the processor-based system 105, the controller 111 may identify a logical address associated with the memory command and access a mapping table (e.g. the logical to physical address table 602 of FIG. 6) to identify a corresponding, physical address to the received logical address. The controller 111 may additionally or instead access the fS flag corresponding to the logical/physical address pair. If the fS flag is indicative that the requested data is not shadowed, the controller may access the physical address associated with the received logical address to access the data. If the fS flag is indicative that the requested data is shadowed, the controller may access the shadow address associated with the received logical address (e.g. as stored in the physical to shadow address table 604) and may request the data from the shadowed address in DRAM. The controller may further access the fC flag associated with the shadowed address. If the fC flag is indicative that the next data chunk is in the NAND flash, the controller may access the next data chunk from NAND flash memory during a time the first data chunk is being accessed from the DRAM and/or provided to the processor-based system 105. If the fC flag is indicative that the next data chunk is in the shadow memory (e.g. DRAM), the controller may not begin accessing NAND flash and instead access a next area in DRAM and/or await a next memory command from the processor-based system 105.

In this manner, memory systems may include NAND flash memory and DRAM memory. Portions of the NAND flash memory may be shadowed to the DRAM memory such that initial portions of memory accesses may be retrieved from the DRAM memory with generally a lower latency than they would have been retrieved from the NAND flash memory. The process of accessing later portions of the memory access from NAND flash may begin while the initial portion or portions are being retrieved from DRAM memory and/or provided to a host. In this manner, latency associated with the NAND flash from the perspective of the host may be reduced.

Embodiments of the present invention may further provide for various housekeeping operations (e.g. wear leveling, bad block replacement) to be performed only at particular times, e.g. power on of the system. In some examples, referring back to FIG. 1, the controller 111 may conduct error correction operations on data written to and/or read from the NAND flash devices 115. In the event bad memory regions are identified during the error correction operations, the controller 111 may log those had memory regions in a management log, which may be stored, for example in one or more of the NAND flash devices 115 and/or in one or more of the DRAM devices 125. The controller 111 may not take action to immediately correct a bad memory region once identified. Instead, in some examples, when the memory system 107 is powered on, or at another specified time, the controller 111 may correct all bad memory regions stored in the management log which had been logged since the last correction took place. Similarly, the controller 111 may count reads and/or writes to the DRAM flash devices for the purposes of wear leveling. Instead of acting immediately on identifying a memory region which should be designated, as bad based on a wear leveling count, the controller 111 may log the memory regions requiring replacement due to wear leveling in a management log, which may be the same or different as the log referred to above with respect to error correction. The controller 111 may then designate as bad memory regions those regions identified management log due to their wear leveling counts at a specified time, e.g. power up.

Accordingly, in some examples, bad block replacement, read disturb, wear leveling, and/or other management tasks may be performed by the memory controller 111 of FIG. 1 responsive to a power cycle (e.g. power up) of the memory system 107. At other times, the controller 111 may not perform these tasks, which may avoid additional latency problems associated with these housekeeping operations.

From foregoing it will be appreciated that, although specific embodiments of the invention have been described herein for purposes of illustration, various modifications may be made without deviating from the spirit and scope of the invention.

What is claimed is:

1. An apparatus comprising:
a memory device of a first type having a first latency;
a memory device of a second type having a second latency that is less than the first latency; and
a controller coupled to the memory device of the first type and the memory device of the second type and during a training period, configured to:
generate a first data structure comprising:
a list of logical addresses associated with memory requests; and
a list of lengths of data to be accessed associated with the memory requests;
re-organize data on the memory device of the first type based, at least in part, on the first data structure; and
generate, based on the data re-organized on the memory device of the first type, a second data structure comprising:
associations between the logical addresses associated with the memory requests and physical addresses of the memory device of the first type;
associations between the physical addresses of the memory device of the first type and shadow addresses of the memory device of the second type when data is stored in both the memory device of the first type and the memory device of the second type; and
a first flag indicating whether data associated with the physical address of the memory device of the first type is shadowed to the memory device of the second type.

2. The apparatus of claim 1, wherein an initial portion of data corresponds to a starting address of data requested from the memory device of the first type.

3. The apparatus of claim 1, further comprising:
a processor-based system coupled to the controller via an interface, the processor-based system configured to submit requests for data to the controller.

4. The apparatus of claim 3, wherein the controller is further configured to provide an initial portion of data to the processor-based system at least in part during the time that a remaining portion of data is accessed on the memory device of the first type.

5. The apparatus of claim 1, wherein a size of an initial portion of data shadowed to the memory device of the second type is based, at least in part, on a latency of the memory device of the first type.

6. The apparatus of claim 1, wherein the controller is further configured to access, based on the second data structure, an initial portion of data from the memory device of the second type at least in part during a time that a remaining portion of data is accessed on the memory device of the first type.

7. The apparatus of claim 1, wherein the second data structure further comprises a second flag indicating whether a second portion of data, following an initial portion of data, is stored in the memory device of the second type.

8. An apparatus comprising:
a non-volatile memory device having a plurality of data segments stored thereon;
a volatile memory device having a lower latency than the non-volatile memory device and having shadowed thereon, from the non-volatile memory device, a plurality of initial portions of data, wherein each initial portion of data of the plurality of initial portions of data is associated with a respective data segment of the plurality of data segments; and
a data structure comprising:
associations between logical addresses of the non-volatile memory device and memory requests;
associations between the logical addresses and physical addresses of the non-volatile memory device;
associations between the physical addresses of the non-volatile memory device and shadow addresses of the volatile memory device; and
a first flag indicating whether data associated with the physical address of the non-volatile memory device is shadowed to the volatile memory device.

9. The apparatus of claim 8, wherein the data structure is stored on the volatile memory device.

10. The apparatus of claim 8, further comprising:
a controller configured to access an initial portion of data of the plurality of initial portions of data in the volatile memory device during a time that the controller accesses a remaining portion of the associated data segment in the non-volatile memory device.

11. The apparatus of claim 10, wherein the controller is further configured to generate the data structure during a training period.

12. The apparatus of claim 8, wherein the data structure further comprises a second flag indicating whether a respective second portion of data, following each of the plurality of initial portions of data, is stored in the volatile memory device.

13. The apparatus of claim 8, wherein a size of an initial portion of data of the plurality of initial portions of data shadowed to the volatile memory device is based, at least in part, on a latency of the non-volatile memory device.

14. A method comprising:
accessing, by a controller, a list of starting addresses and lengths of a plurality of data segments stored in a memory device of a first type;
shadowing, by the controller, one or more initial portions of data associated with a respective data segment of the plurality of data segments from the memory device of the first type to a memory device of a second type based, at least in part, on the starting addresses and lengths, wherein the memory device of the second type has a latency that is less than the memory device of the first type;
generating, by the controller, a data structure comprising an association between logical addresses associated with memory requests, physical addresses of the memory device of the first type, shadow addresses of the memory device of the second type, and a first flag indicating whether an initial portion of a data segment is shadowed to the memory device of the second type; and
providing to a processor-based system, by the controller, an initial portion of a requested data segment on the memory device of the second type during a time that a remaining portion of the requested data segment is accessed by the controller on the memory device of the first type.

15. The method of claim 14, wherein the list of starting addresses and lengths is generated during a training period.

16. The method of claim 15, wherein the training period comprises:
logging, by a controller, addresses of memory commands received from a processor-based system; and
analyzing, by the controller, the addresses of the memory commands to generate the list of starting addresses and lengths.

17. The method of claim 15, wherein the training period comprises:
   identifying, by the controller, one or more headers indicative of a starting address of a data segment in the memory device of the first type.

18. The method of claim 14, wherein the data structure further comprises a second flag indicating whether a respective second portion of data, following each of the one or more initial portions of data, is stored in the memory device of the second type.

19. The method of claim 14, wherein a size of the one or more initial portions shadowed to the memory device of the second type is based, at least in part, on a latency of the memory device of the first type.

* * * * *